United States Patent
Lyon et al.

(10) Patent No.: US 7,686,229 B2
(45) Date of Patent: Mar. 30, 2010

(54) RFID READER DEVICE HAVING CLOSELY PACKED ANTENNAS

(75) Inventors: Geoff Lyon, Menlo Park, CA (US); Alan McReynolds, Los Altos, CA (US); Ian Robinson, Pebble Beach, CA (US); Cyril Brignone, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 934 days.

(21) Appl. No.: 11/389,750

(22) Filed: Mar. 27, 2006

(65) Prior Publication Data

US 2006/0165039 A1 Jul. 27, 2006

Related U.S. Application Data

(63) Continuation-in-part of application No. 10/354,109, filed on Jan. 30, 2003.

(51) Int. Cl.
*G06K 5/00* (2006.01)

(52) U.S. Cl. .................. 235/492; 235/451; 235/385; 340/572.1; 340/572.3; 340/572.5; 340/10.1; 340/10.2; 705/23; 705/65; 705/16; 37/334

(58) Field of Classification Search .................. 235/492, 235/401, 385
See application file for complete search history.

(56) References Cited

U.S. PATENT DOCUMENTS

| | | | |
|---|---|---|---|
| 3,864,043 A | 2/1975 | Russell | |
| 4,636,634 A | 1/1987 | Harper et al. | |
| 4,839,875 A | 6/1989 | Kuriyama et al. | |
| 4,903,815 A | 2/1990 | Hirschfeld et al. | |
| 5,038,023 A | 8/1991 | Saliga | |
| 5,216,618 A | 6/1993 | Arita et al. | |
| 5,303,214 A | 4/1994 | Kulakowski et al. | |
| 5,418,732 A | 5/1995 | McFadin | |
| 5,455,409 A | 10/1995 | Smith et al. | |
| 5,583,819 A | 12/1996 | Roesner et al. | |
| 5,771,003 A | 6/1998 | Seymour | |
| 5,790,795 A | 8/1998 | Hough | |
| 5,869,820 A | 2/1999 | Chen et al. | |
| 5,963,134 A | 10/1999 | Bowers et al. | |
| 5,991,759 A | 11/1999 | Knoblock et al. | |
| 6,119,941 A | 9/2000 | Katsandres et al. | |
| 6,127,928 A | 10/2000 | Issacman et al. | |
| 6,208,235 B1 * | 3/2001 | Trontelj | 340/10.1 |
| 6,335,686 B1 | 1/2002 | Goff et al. | |
| 6,354,493 B1 * | 3/2002 | Mon | 235/380 |
| 6,407,933 B1 | 6/2002 | Bolognia et al. | |
| 6,448,886 B2 | 9/2002 | Garber et al. | |
| 6,462,670 B1 | 10/2002 | Bolognia et al. | |

(Continued)

*Primary Examiner*—Jude J Jean Gilles

(57) ABSTRACT

A reader device for locating and tracking multiple tags includes a plurality of closely packed antenna circuits and at least one controller configured to control the plurality of closely packed antenna circuits. The at least one controller is configured to activate one or more of the antenna circuits to generate at least one resonance signal field configured to interrogate at least one tag associated with the one or more active antenna circuits while substantially preventing or reducing cross-coupling of signals between the one or more active antenna circuits and at least one antenna circuit within the at least one resonance signal field to a sufficiently low level, wherein the sufficiently low level substantially prevents misreads from unwanted tags, to thereby track the multiple tags in a substantially controlled manner.

20 Claims, 13 Drawing Sheets

U.S. PATENT DOCUMENTS

| | | | |
|---|---|---|---|
| 6,473,762 B1 | 10/2002 | Knoblock et al. | |
| 6,598,789 B1 | 7/2003 | Matsumoto et al. | |
| 6,633,821 B2 | 10/2003 | Jackson et al. | |
| 6,681,299 B1 | 1/2004 | Shimamura et al. | |
| 6,681,990 B2 | 1/2004 | Vogler et al. | |
| 6,784,802 B1 | 8/2004 | Stanescu | |
| 6,792,507 B2 | 9/2004 | Chiou et al. | |
| 6,847,856 B1 | 1/2005 | Bohannon | |
| 6,946,950 B1 | 9/2005 | Ueno et al. | |
| 6,968,994 B1 | 11/2005 | Smith | |
| 6,985,819 B2 | 1/2006 | Lipscomb et al. | |
| 7,010,647 B1 | 3/2006 | Karamchetty et al. | |
| 7,350,715 B2 * | 4/2008 | Pradhan et al. | 235/492 |
| 7,439,862 B2 | 10/2008 | Quan | |
| 7,468,669 B1 | 12/2008 | Beck et al. | |
| 2002/0149468 A1 * | 10/2002 | Carrender et al. | 340/5.61 |
| 2002/0175805 A9 | 11/2002 | Armstrong et al. | |
| 2003/0121060 A1 | 6/2003 | McClellan | |
| 2003/0174099 A1 | 9/2003 | Bauer et al. | |
| 2004/0100413 A1 | 5/2004 | Waldner | |
| 2004/0164864 A1 | 8/2004 | Chung et al. | |
| 2005/0012613 A1 | 1/2005 | Eckstein et al. | |
| 2005/0184856 A1 | 8/2005 | Pourchot | |
| 2005/0215119 A1 | 9/2005 | Kaneko | |
| 2005/0219050 A1 | 10/2005 | Martin | |
| 2007/0040687 A1 | 2/2007 | Reynolds | |
| 2007/0252698 A1 | 11/2007 | Turner | |

* cited by examiner

RFID READER DEVICE HAVING CLOSELY PACKED ANTENNAS

PRIORITY

This application is a Continuation-in-Part of U.S. patent application Ser. No. 10/354,109 to Lyon et al., filed on Jan. 30, 2003, and entitled, "DEVICE DATA," the disclosure of which is incorporated by reference in its entirety.

RELATED APPLICATION

This application is related to the following commonly assigned and U.S. Utility patent application Ser. No. 11/389,751, entitled "RFID ENABLED CABLE TRACKING", filed on even date herewith, the disclosure of which is hereby incorporated by reference in its entirety.

BACKGROUND

Recently, the use of radio frequency identification (RFID) technology to locate and track various types of items has gained increased popularity. One reason for this increase is that the costs associated with manufacturing and implementing readers and tags employing RFID technology has steadily been decreasing. In addition, RFID readers and tags have been manufactured to be ever smaller for more densely packed RFID applications.

RFID applications typically employ a single reader matched to a single antenna, as shown in FIG. 7. FIG. 7, more particularly, depicts a system diagram for two single channel, single antenna readers 700. The readers 700 are depicted as including respective reader boards 702 and capacitively coupled antenna matching circuits 704, which thus include a pair of capacitors 706 and an inductor 708. The capacitively coupled antenna matching circuit 704 enables the source impedance of the reader 700 to be matched using a pair of capacitors in parallel with the inductor 708, which operates as the antenna. The combined capacitance of the capacitors 706 in series, together with the inductor 708 provides a parallel resonant antenna.

As also shown in FIG. 7, the antenna circuit 704 forms a resonant structure that acts as a current loop. In other words, an external magnetic field 710 causes a current to be induced into the inductor 708, which circulates around the loop created by the inductor 708 and the capacitors 706. This current loop is the primary cause of antenna cross coupling when antennas are placed in close proximity to each.

More particularly, when an antenna circuit 704 is energized by a current (Is), the magnetic field 710 generated through the inductor 708 cross couples into an adjacent antenna 704. This cross-coupling causes a secondary current (Iz) to circulate in the adjacent matching circuit 704. This secondary and cross-coupled current (Iz) then, in turn, causes the magnetic field 710 to be re-radiated via the inductors 708 to the respective antenna circuits 704 that are cross-coupled to the first antenna circuit 704. This results in the undesirable effect of spreading the magnetic field 710 through the antennas of multiple readers 700. This also results in tag reads coupling across adjacent antennas 704, sometimes with multiple successive hops across multiple antennas 704, so that the relative locations of the tags with respect to the antennas 704 may be difficult or impossible to determine.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring to a number of exemplary embodiments thereof. In the following descriptions, numerous specific details are set forth in order to provide a thorough understanding of the present invention. It will be apparent however, to one of ordinary skill in the art, that the present invention may be practiced without limitation to these specific details. In other instances, well known methods and structures have not been described in detail so as not to unnecessarily obscure the present invention.

A reader device for locating and tracking tags with a plurality of closely packed antenna circuits is disclosed herein. The tags may comprise radio frequency identification (RFID) devices and the reader device may comprise a radio frequency reader device. In addition, as used throughout the present specification, the terms "closely packed" generally indicates that a first antenna is positioned sufficiently close to one or more adjacent secondary antennas such that a signal transmitted by the first antenna may cause at least one of the adjacent secondary antennas to be coupled with the first antenna. In addition, the terms "closely packed" may also refer to an array of overlapping antenna circuits that occupy common space within the array and energize shared spatial regions. Systems and methods for substantially preventing cross-coupling of signals between such closely packed antenna circuits, to thereby enable substantially accurate and independent identification of multiple tags, as well as information retrieval from the multiple tags, are further disclosed herein below.

Figure 1:
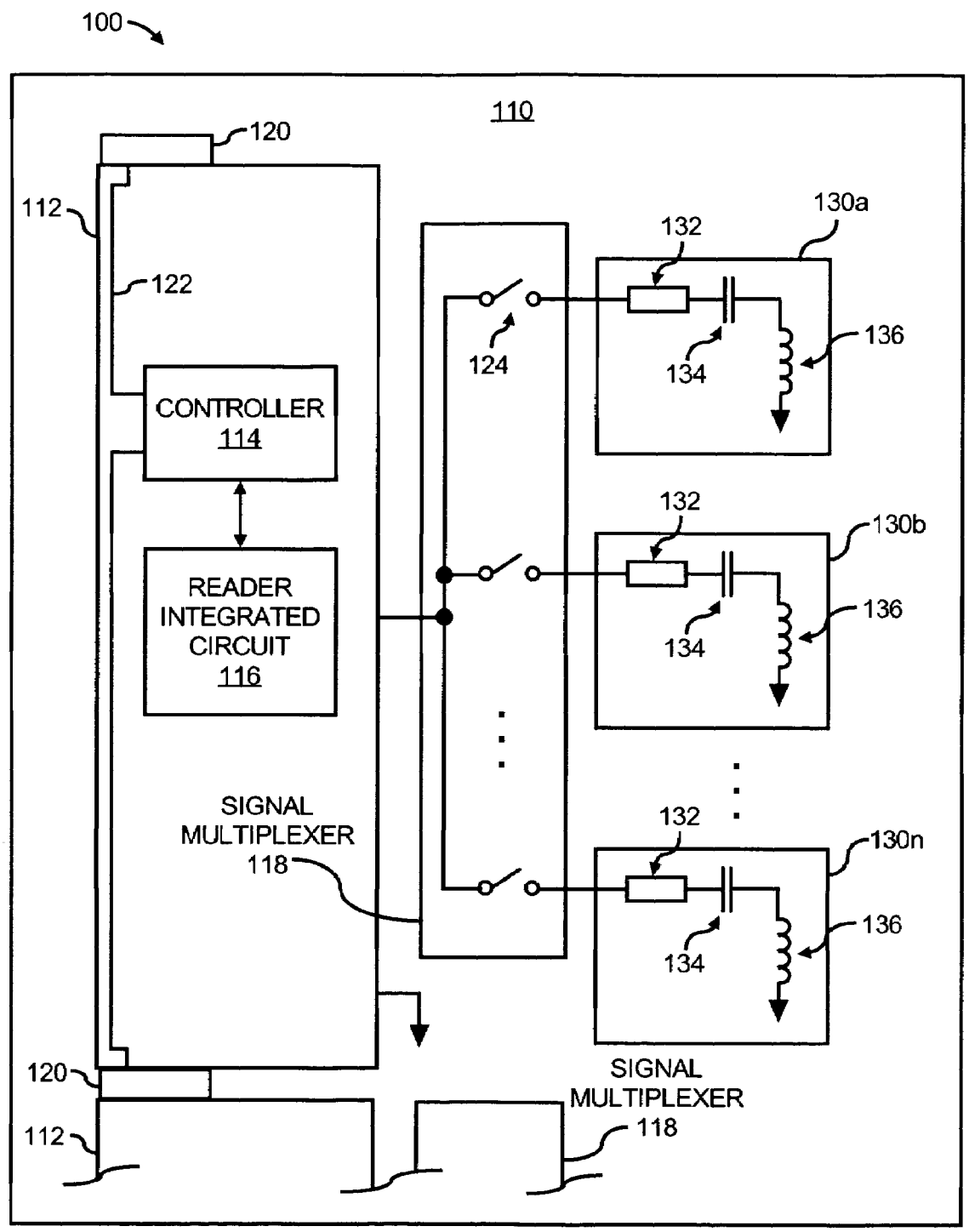
FIG. 1 shows a simplified schematic diagram of a system for locating and tracking tags, according to an embodiment of the invention.

With reference to FIG. 1, there is shown a simplified schematic diagram of a system 100 for locating and tracking tags, according to an example. Although particular reference has been made herein below to the system 100 as including particular features, it should be understood that the system 100 may include additional components and that some of the components described may be removed and/or modified without departing from a scope of the system 100.

The system 100 is illustrated as including a reader device 110, which is described in greater detail herein below. The system 100 may also include a number of tags (not shown) associated with a number of assets to be located and tracked (also not shown). In one respect, the reader device 110 may be employed to locate and track tags to thereby locate and track a variety of assets to which the tags are associated. The assets may include, for instance, components housed in a data center, products housed on a display rack, cables for computing devices, etc.

As shown in FIG. 1, the reader device 110 is depicted as including a plurality of reader boards 112 to which antenna circuits 130a-130n, where "n" is an integer equal to or greater than one, are in communication. It should be understood that the reader device 110 may include a single reader board 112 as well as any reasonably suitable number of antenna circuits 130a-130n, including a single antenna circuit 130a. In any regard, each of the reader boards 112 includes a controller 114 for controlling the antenna circuits 130a-130n and for processing information received from tags through the antenna circuits 130a-130n. Each of the reader boards 112 also includes a reader integrated circuit 116 and a signal multiplexer 118.

The controller 114 and the reader integrated circuit 116 are depicted as being configured to communicate with each other and the signal multiplexer 118. In addition, the reader board 112 is depicted as including connectors 120 to which the controller 114 is connected through a serial port 122. By way of example, the connectors 120 may enable data collected from the controller 114 to be communicated to another device, such as another reader board 112, another controller (not shown), etc. In addition, or alternatively, the connectors 120 may enable adjacent reader boards 112 to be physically connected to each other and may comprise any reasonably suitable type of connector, such as, a male/female-type connector. As such, for instance, a plurality of reader boards 112 may be employed to obtain information from a plurality of tags.

The reader integrated circuits 116 are generally configured to convert digital signals from the controller 114 into modulated energizing signals to be sent through the signal multiplexers 118 and to the antenna circuits 130a-130n. The reader integrated circuits 116 may also demodulate amplitude variations that may be introduced into the digital signals when a tag is placed in the resonance signal field of an antenna circuit 130a-130n. The reader integrated circuits 116 may further select the appropriate signal processing parameters based upon a chosen protocol. For instance, the reader integrated circuits 116 may output demodulated tag signals from which the controllers 114 may decode to derive the identification and memory contents of an interrogated tag.

The controller 114 of a reader board 112 may be programmed to sequentially activate the antenna circuits 130a-130n from left to right, from right to left, or in any desired pattern, since the locations of the antenna circuits 130a-130n have previously been recorded. It is also contemplated that multiple antenna circuits 130a-130n may be activated simultaneously, for instance, in configurations where the reader device 110 includes multiple reader boards 112, and thus multiple controllers 114 and multiplexers 116.

In any event, the controller 114 of a reader board 112 may query the status of a given location associated with the antenna circuits 130a-130n by activating the antenna circuits 130a-130n to detect the presence or absence of tags. The locations of the antenna circuits 130a-130n may be stored in a memory (not shown) of the controller 114, such as in a non-volatile memory or a separate storage device (not shown). Thus, the controller 114 may correlate detected tags to the predesignated or known location of each antenna circuit 130a-130n.

With reference again to FIG. 1, the antenna circuits 130a-130n have been configured to substantially eliminate or reduce the effect of cross-coupling among closely packed antenna circuits 130a-130n to a level too low to enable unwanted tags to respond to energizing signals from the controller 114. In other words, cross-coupling between the antenna circuits 130a-130n may be reduced to a sufficiently low level, where the sufficiently low level substantially prevents misreads from unwanted tags. As such, the controller 114 may receive data from desired tags without substantial interference from signals that may be received by other cross-coupled antenna circuits 130a-130n. The antenna circuits 130a-130n are termed "closely packed" for purposes of this disclosure to generally indicate that at least one of the antenna circuits 130a-130n is within a resonance signal field of another antenna circuit 130a-130n. As such, the terms "closely packed" may also generally indicate that at least one of the antenna circuits 130a-130n may become coupled or tuned to a second antenna circuit 130a-130n when the second antenna circuits 130a-130n is activated. The terms "closely packed" may additional refer to overlapping antenna circuits 130a-130n, which occupy common space and energize shared spatial regions.

The antenna circuits 130a-130n depicted in FIG. 1 comprise RLC circuits, in which, a resistor 132 and a capacitor 134 are placed in series with an inductor 136. In the configuration shown in FIG. 1, the LC components 134, 136 form a frequency tuned series resonant network, where the inductor (L) 136 is the antenna. The resistor 132 is used to control the Q-factor for the antenna circuits 130a-130n, which directly influences the time response characteristics and frequency spreading of the antenna circuits 130a-130n.

In addition, the antenna circuits 130a-130n are depicted as being connected to respective switches 124 of the signal multiplexer 118. Although not shown, the switches 124 may comprise integrated circuits that instead form part of the reader board 112. The switches 124 may, in addition, or alternatively, be implanted using an analog switch integrated circuit, providing the devices operating characteristics, for instance, on resistance, parasitic capacitances and frequency response, are suitable.

In any regard, when activated, the selected antenna circuits 130a-130n emit resonant signal fields configured to interrogate one or more tags and to thereby locate and track the one or more tags. Through implementation of the switches 124, when the selected antenna circuits 130a-130n are activated, the selected antenna circuits 130a-130n are isolated from the reader device 110. In other words, the unselected antenna circuits 130a-130n do not form current loops, and thus are substantially prevented from cross-coupling with the active antenna circuits 130a-130n.

Figure 2A:
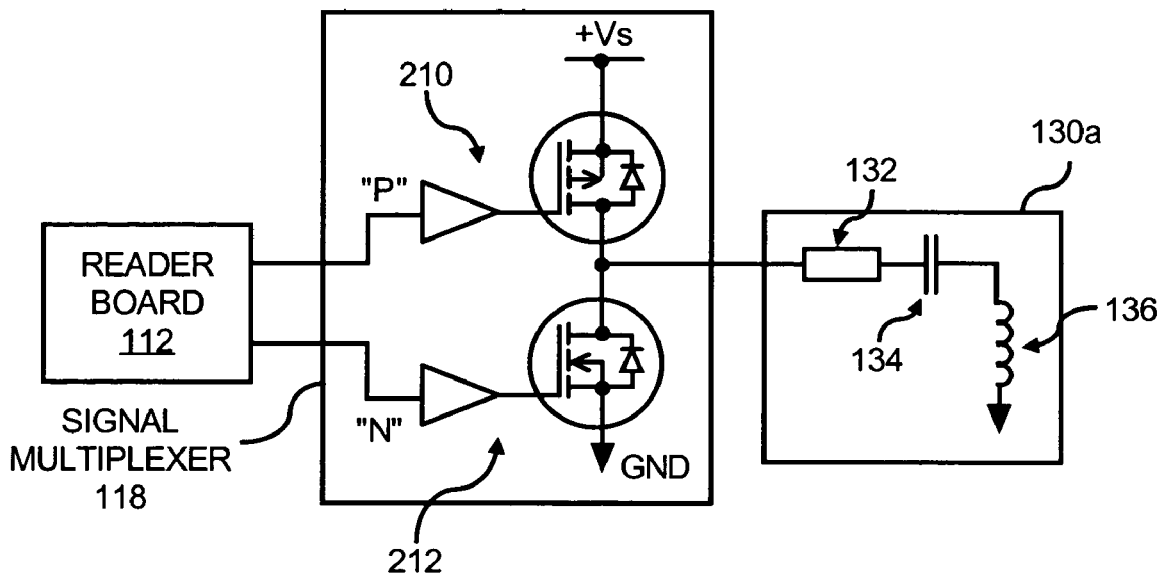
FIGS. 2A-2E depict simplified schematic diagrams of reader devices, according to further embodiments of the invention.

A second example of a suitable antenna circuit 130a-130n configuration configured to substantially eliminate or reduce cross-coupling is shown with respect to the reader device 200 depicted in FIG. 2A. As shown, a complementary pair of MOSFET transistors 210,212 is used to generate the energizing signals for each of the RLC antenna circuits 130a-130n. The MOSFET gate drive signals ("P" & "N") are driven as in-phase clock signals when the channel is active, causing the selected antenna circuit 130a-130n to be toggled between VS and GND at the energizing frequency, for instance, 13.56 MHz for HF RFID. When inactive, "P" is held high and "N" is held low to turn both transistors 210, 212 off and, as in FIG. 1, disconnects selected ones of the antenna circuits 130a-130n to avoid cross-coupling between the antenna circuits 130a-130n.

The RLC antenna circuits 130a-130n depicted in FIGS. 1 and 2A illustrate two examples of RLC antenna circuits 130a-130n suitable for substantially preventing cross-coupling of the antenna circuits 130a-130n. Additional examples of suitable antenna circuits 130a-130n that may be employed to substantially prevent cross-coupling between antenna circuits 130a-130n are depicted in FIGS. 2B-2E. It should be understood that the examples depicted in FIGS. 2B-2E are not exhaustive of the possible antenna circuit 130a-130n configurations that may be employed to substantially eliminate or reduce cross-coupling between the antenna circuits 130a-130n.

More particularly, FIGS. 2B-2E depict simplified schematic diagrams of reader devices 220, 230, 240 and 250 according to further examples. The reader devices 220, 230, 240 and 250 generally include all of the elements of the reader device 110 depicted in FIG. 1. As such, those elements sharing the same reference numerals are not discussed in great detail herein below with respect to FIGS. 2B-2E. Instead, those features of the reader devices 220, 230, 240 and 250 that differ from the reader device 110 are discussed.

Figure 2B:
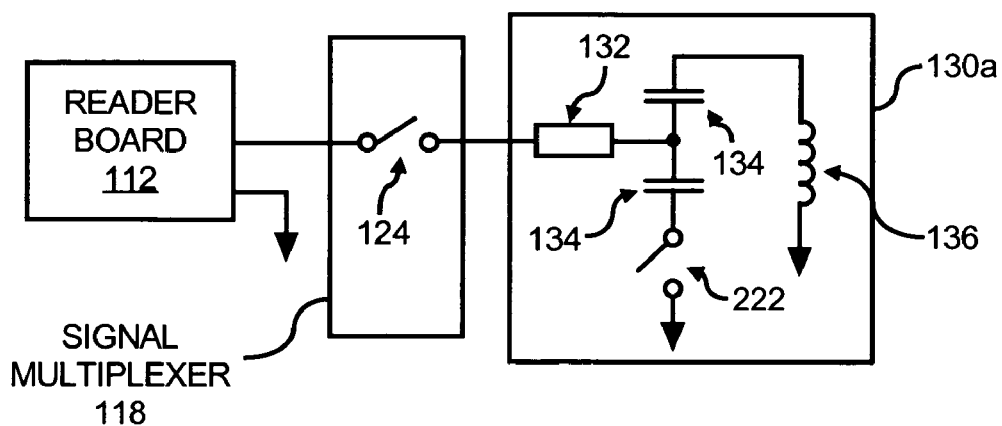

With particular reference first to FIG. 2B, the reader device 220 is depicted as including an additional capacitor 134 and an additional switch 222. The RLC antenna circuit 130a-130n in the reader device 220 may employ the additional switch 222 to substantially break the inductive parallel loop formed by the RLC antenna circuit 130a-130n. As such, the antenna circuit 130a-130n may be further decoupled from an active antenna circuit 130a-130n when the additional switch 222 is open.

Figure 2C:
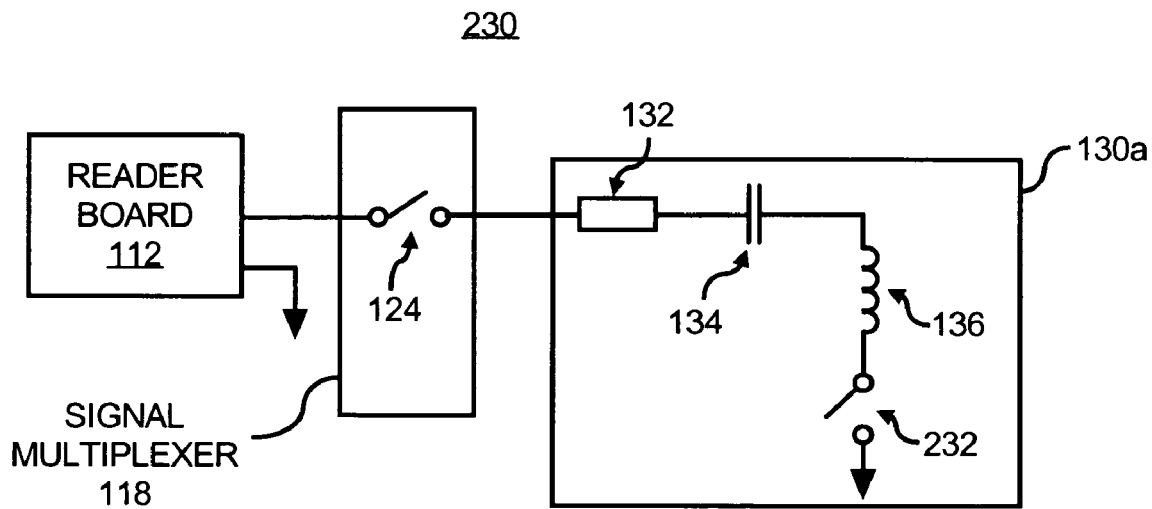

With reference now to the reader device 230 depicted in FIG. 2C, a switch 232 is shown as being positioned between the inductor 136 and the ground point. This configuration generally operates in manners similar to those discussed above with respect to the reader device 110 in FIG. 1, except that the RLC antenna circuit 130a-130n may also be broken at a different location in the antenna circuit 130a-130n depicted in FIG. 2C.

Figure 2D:
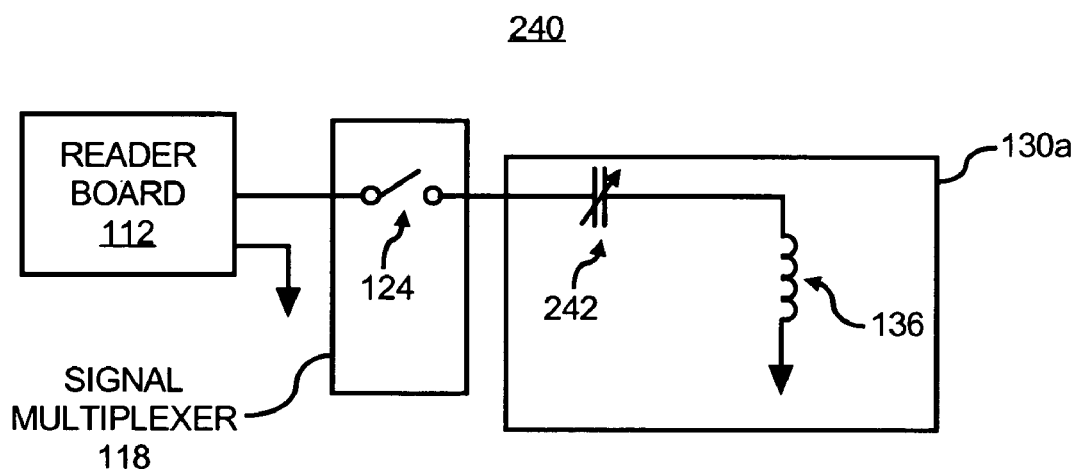

With particular reference now to FIG. 2D, the reader device 240 is depicted as including a variable capacitor 242. In this example, the capacitance of the variable capacitor 242 may be varied to thereby vary the resonance frequency created by the LC antenna circuit 130a-130n. For instance, the variable capacitor 242 may be set to cause the LC antenna circuit 130a-130n to resonate at a frequency tuned to an associated tag, whereas the variable capacitors 242 of unselected antenna circuits 130a-130n may be set to cause the unselected antenna circuits 130a-130n to resonate at one or more different frequencies. As such, if an unselected antenna circuit 130a-130n is caused to resonate by the resonance of the selected antenna circuit 130a-130n, the tags associated with the unselected antenna circuits 130a-130n may not become activated because the frequency at which their associated antenna circuits 130a-130n are resonating may not be tuned with their respective antenna circuits (not shown). In this regard, the unselected antenna circuits 130a-130n may be detuned from selected antenna circuits 130a-130n.

Figure 2E:
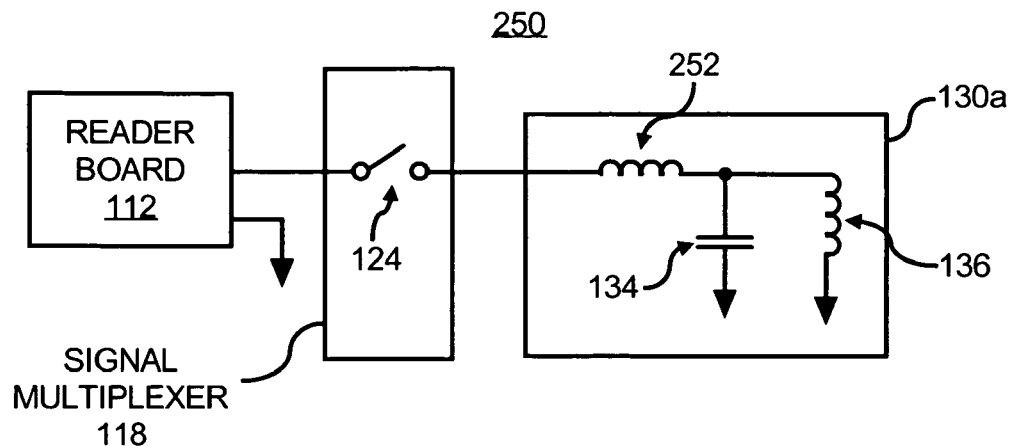

Referring now to FIG. 2E, the reader device 250 is depicted as including an additional inductor 252 and the capacitor 134 is depicted as being in parallel with the inductor 136. In this configuration, when the LC antenna circuit 130a-130n is de-selected by the controller 114, the antenna circuit 130a-130n will have a different resonance frequency as compared with activated antenna circuits 130a-130n. As such, the de-selected antenna circuits 130a-130n may be detuned from the activated antenna circuits 130a-130n.

Examples of applications in which the reader devices described above may be employed will now be provided with respect to the following figures.

Figure 3A:
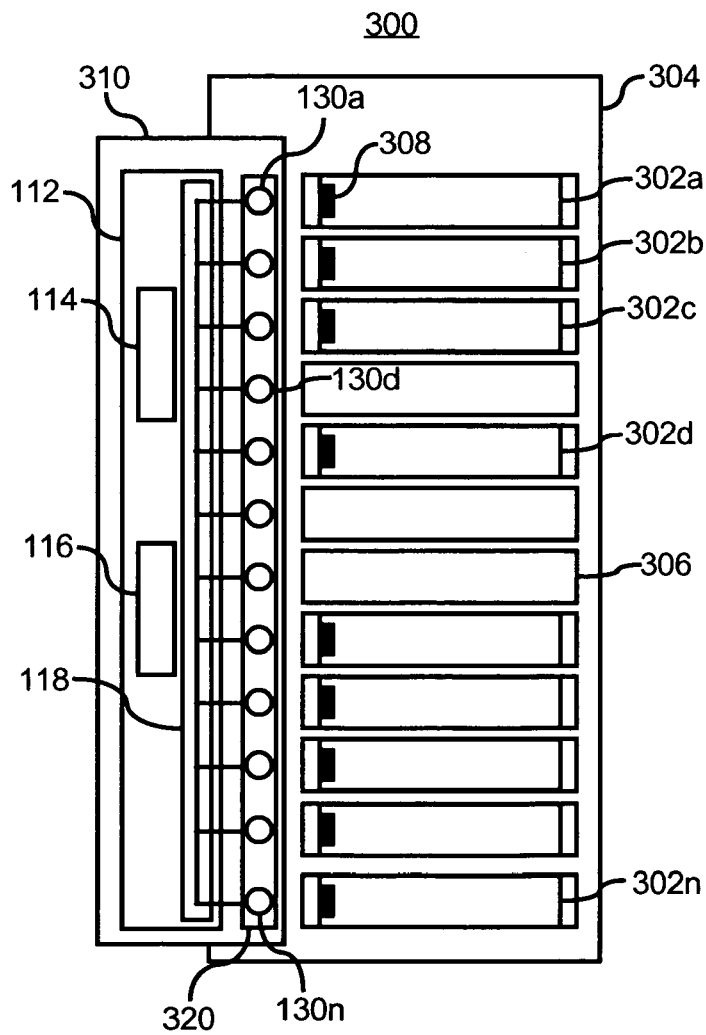
FIGS. 3A-3E show simplified frontal views of asset locating and tracking systems according to five embodiments of the invention.

FIG. 3A shows a simplified frontal view of an asset locating and tracking system 300, according to an example. Although particular has been made herein below to the system 300 as including particular features, it should be understood that the system 300 may include additional components and that some of the components described may be removed and/or modified without departing from a scope of the system 300.

As shown in FIG. 3A, a reader device 310 is generally depicted as being arranged to locate and track assets 302a-302n in a rack 304. The rack 304 may comprise an electronics cabinet and the assets 302a-302n may comprise, for instance, computer systems, servers, memories, hard drives, power supplies, etc. Although the rack 304 has been illustrated as comprising a relatively small number of bays 306 and assets 302a-302n, it should be understood that the rack 304 may include any reasonably suitable number of bays 306 and assets 302a-302n without departing from a scope of the system 300.

The reader device 310 may be positioned with respect to the rack 304 to substantially prevent the blockage of airflow through the rack 304 as well as access to the assets 302a-302n. In this regard, for instance, the antenna board 112 may be positioned on part of a door (not shown), such that the antenna board 112 may be moved from a blocking position when the door is opened and in a substantially reading position when the door is closed, etc. In the latter example, the reader board 112 may be positioned on the door or at a location away from the door.

The assets 302a-302n are depicted as including respective tags 308. The tags 308 may be encoded with any reasonably suitable identification, such as medium access controlled identification of the assets 302a-302n with which the tags 308 are associated. The tags 308 may comprise, for instance, radio frequency (RF) tags programmed with substantially unique identification codes that identify the assets 302a-302n with which the tags 308 are associated. The tags 308 may comprise active devices, passive devices, or combination of active and passive devices.

As used herein, the terminology "tag" may be defined as hardware, information, signals, and the like, that are not necessarily intrinsic to the circuitry or software associated with the assets 302a-302n to which the tags 308 are associated. In other words, the tags 308 may be internally or externally attached to respective assets 302a-302n and may be independent of the intrinsic workings of the respective assets 302a-302n.

The tags 308 are shown mounted onto left front portions of each asset 302a-302n, but the tags 308 may be mounted to, printed on, or encapsulated within each of the respective assets 302a-302n. The tags 308 may be attached to the respective assets 302a-302n by adhesive, by double-sided tape, by metal fasteners, and the like. Those skilled in the art will recognize that many other methods of physically associating the tags 308 with respective assets 302a-302n are possible and the present invention is not limited to the examples set forth herein. In other words, it is not necessary to mount the tags 308 exactly as shown and it is contemplated that the tags 308 may be located at any other reasonably suitable location with respect to the assets 302a-302n, so long as the reader device 310 is capable of interrogating the tags 308.

The reader device 310 may comprise any of the configurations depicted herein above with respect to the reader devices shown in FIGS. 1 and 2A-2E. The reader device 310 may alternatively comprise other configurations capable of substantially eliminating or reducing the effects of cross-coupling among the antenna circuits 130a-130n to a level too low to allow unwanted tags 308 from responding to energizing signals from the controller 114.

The antenna circuits 130a-130n are depicted as being arranged on an antenna board 320, which may form part of the reader board 112 or a separate board as shown. The antenna board 320 is depicted as including a plurality of closely packed antenna circuits 130a-130n. As described above, the antenna circuits 130a-130n emit resonance signals which are used to interrogate associated tags 308. A tag 308 may be considered as being associated with an antenna circuit 130a-130n if the tag 308 is located within a resonance signal field of the antenna circuit 130a-130n.

In the example illustrated in FIG. 3A, the reader device 310 is depicted as including a single reader board 112 and multiple antenna circuits 130a-130n. In addition, the number of antenna circuits 130a-130n is depicted as being equivalent to the number of bays 306 in the rack 304. In this regard, each of the antenna circuits 130a-130n may be employed to interrogate a respective tag 308 to thereby substantially maximize the read reliability of the tags 308.

Figure 3B:
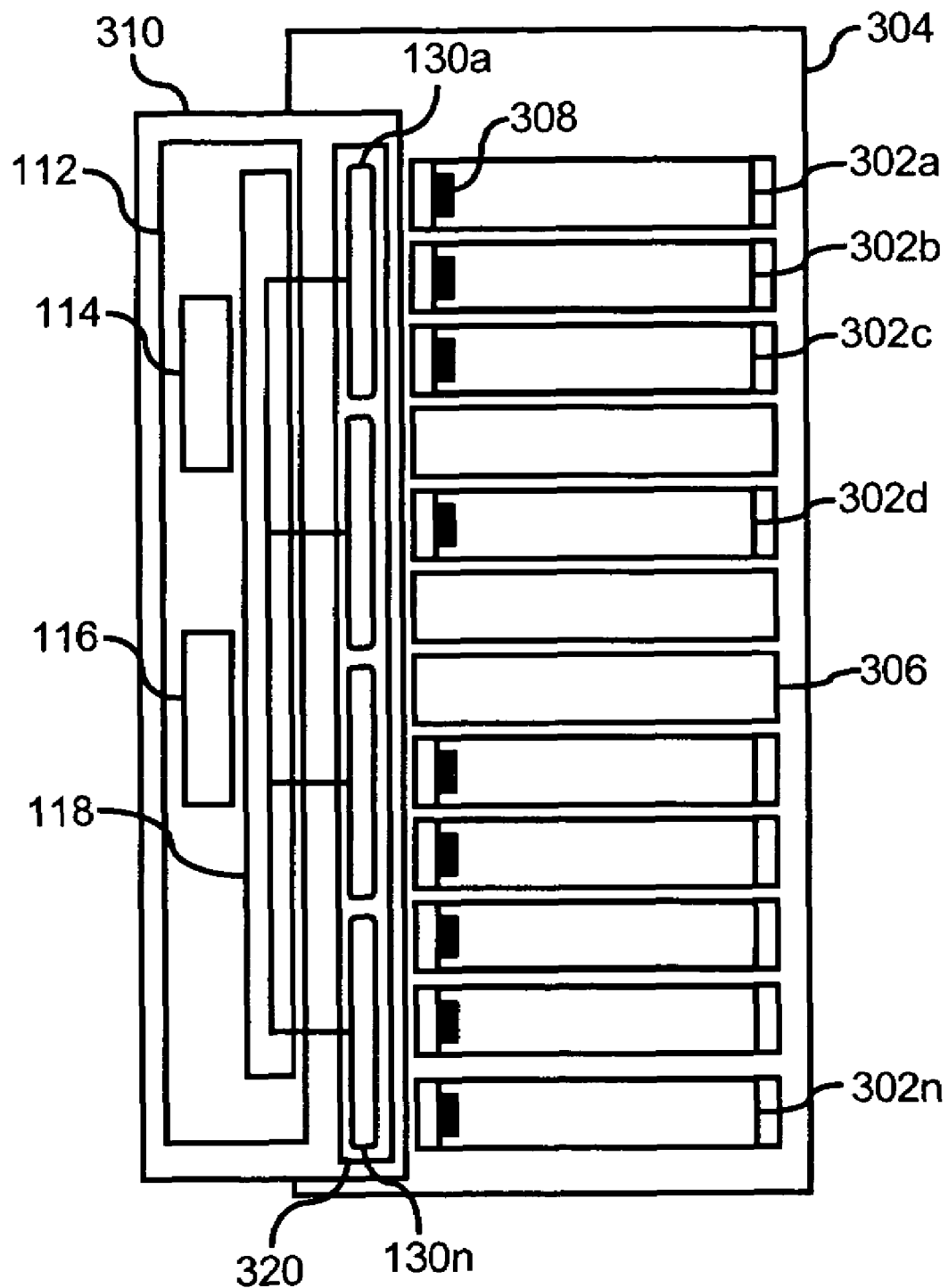

In another example, a smaller number of antenna circuits 130a-130n than tags 308 may be employed, for instance, in situations where knowledge of the exact locations of the assets 302a-302n is not required. The asset locating and tracking system 330 depicted in FIG. 3B is an example where a lesser number of antenna circuits 130a-130n are employed to track the assets 302a-302n. In FIG. 3B, four relatively larger antenna circuits 130a-130n are depicted as positioned to interrogate the tags 308. More particularly, each of the antenna circuits 130a-130n is depicted as being positioned to interrogate three tags 308.

In one regard, the antenna circuits 130a-130n may be employed to determine which assets 302a-302n are located in which rack 304, for example, through use of a binary tree-search algorithm to determine the number of tags 308 each antenna circuit 130a-130n is able to interrogate. In addition, the antenna circuits 130a-130n may be employed to determine more general locations of the assets 302a-302n within the racks 304, such as, a bottom half, a top quarter, etc., of the racks 304.

Figure 3C:
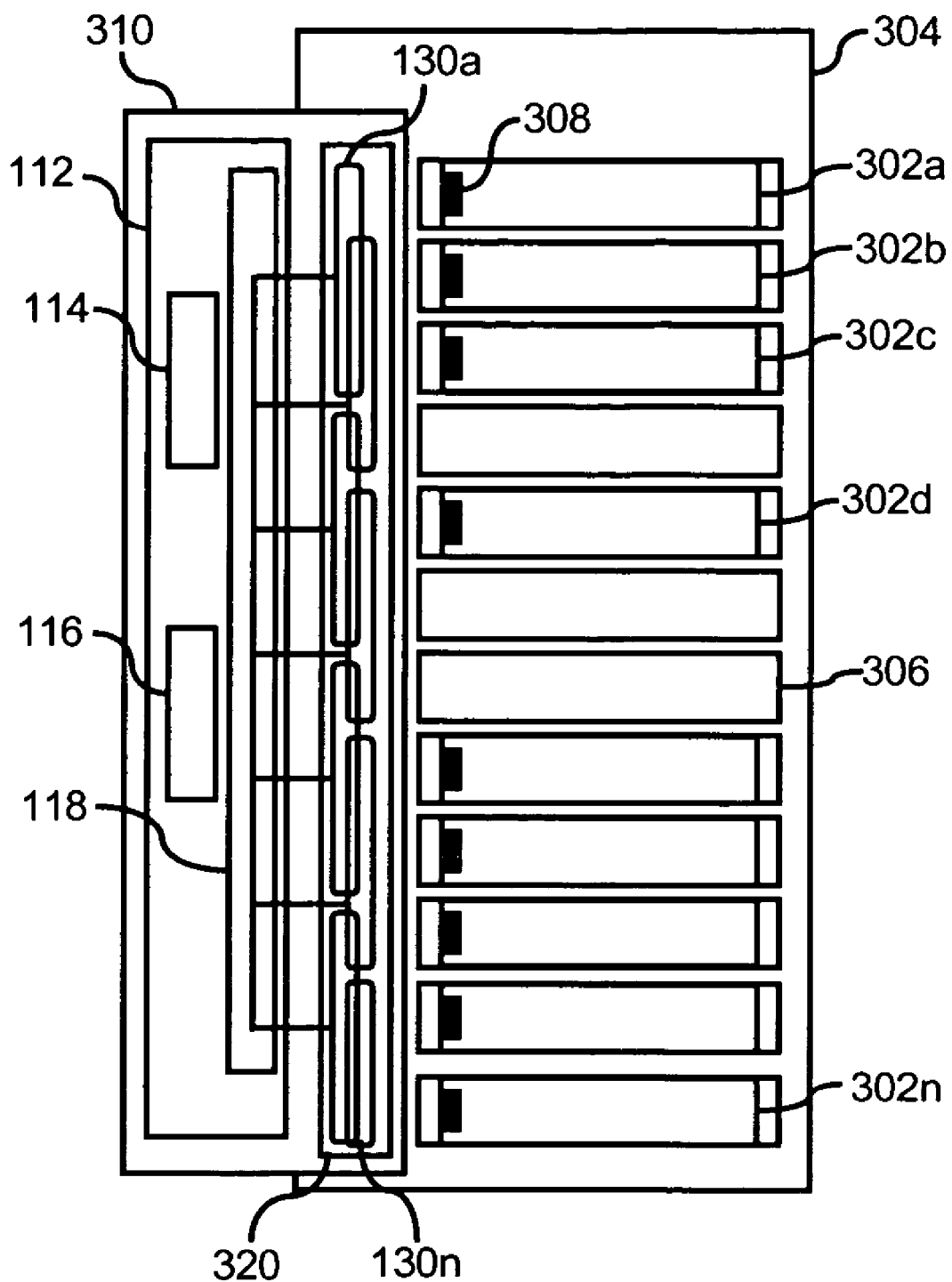

In a further example, some of the antenna circuits 130a-130n may overlap each other to thereby occupy common space and energize shared spatial regions. The asset locating and tracking system 350 depicted in FIG. 3C is an example of antenna circuits 130a-130n that overlap with each other at various bay 306 intervals. More particularly, a first set of antenna circuits 130a-130n is depicted as covering three bays 306 each and a second set of antenna circuits 130a-130n is also depicted as covering three bays 306 each, but shifted by one bay 306. The results of the interrogations performed by the sets of antenna circuits 130a-130n may be correlated to determine the tag 308 locations with a resolution of two bays 306.

It should be understood that the antenna circuits 130a-130n may be configured to have other overlapping schemes to therefore determine the tag 308 locations with differing bay 306 resolutions without departing from a scope of the asset locating and tracking system 350.

Figure 3D:
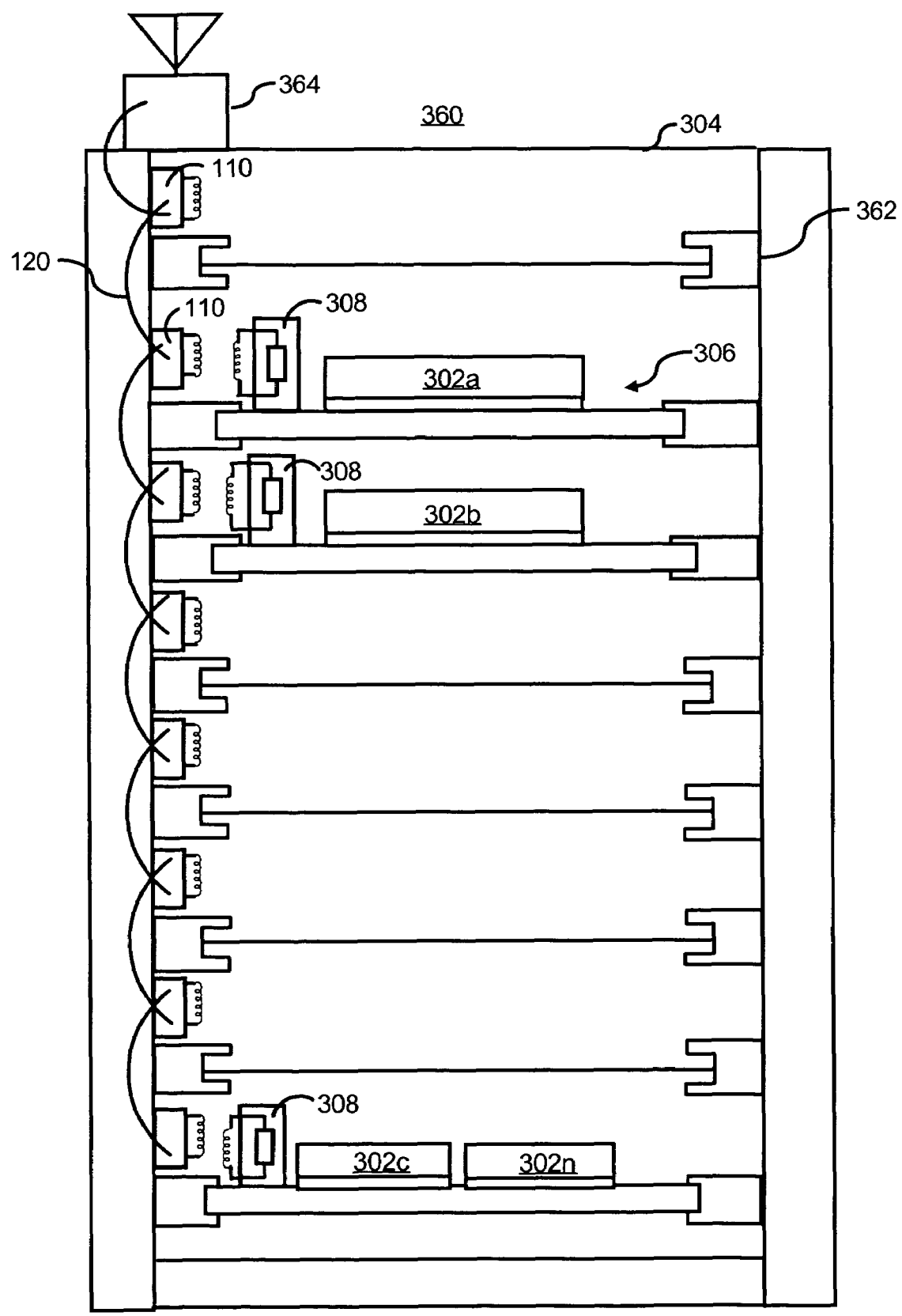

In a yet further example, a plurality of reader devices 110 may be positioned along the bays 306 of the rack 304, as shown in FIG. 3D. In addition, the locations of the assets 302a-302n may be detected based upon the positions of the reader devices 110 with respect to the bays 306, as described in greater detail in co-pending and commonly assigned U.S. patent application Ser. No. 10/354,109 to Lyon et al., filed on Jan. 30, 2003, and entitled, "DEVICE DATA," the disclosure of which is incorporated by reference in its entirety.

As discussed in that application for patent, the rack 304 includes opposed pairs of mounts 362 that define the bays 306 into which the assets 302a-302n are positioned. It should be noted that the mounts 362 and bays 306 merely exemplify one of any number of mounting means that are used with rack apparatus. In addition, the reader devices 110 are depicted as being in communication with each other and a node 362 through the connectors 120. The node 362, may operate in various manners as disclosed in the Ser. No. 10/354,109 application for patent.

Although the reader devices 110 have been depicted as having a one-to-one correspondence with the bays 306, it should be understood that a lesser number of reader devices 110 may be employed to interrogate the tags 308, as described herein above with respect to FIG. 3A.

Figure 3E:
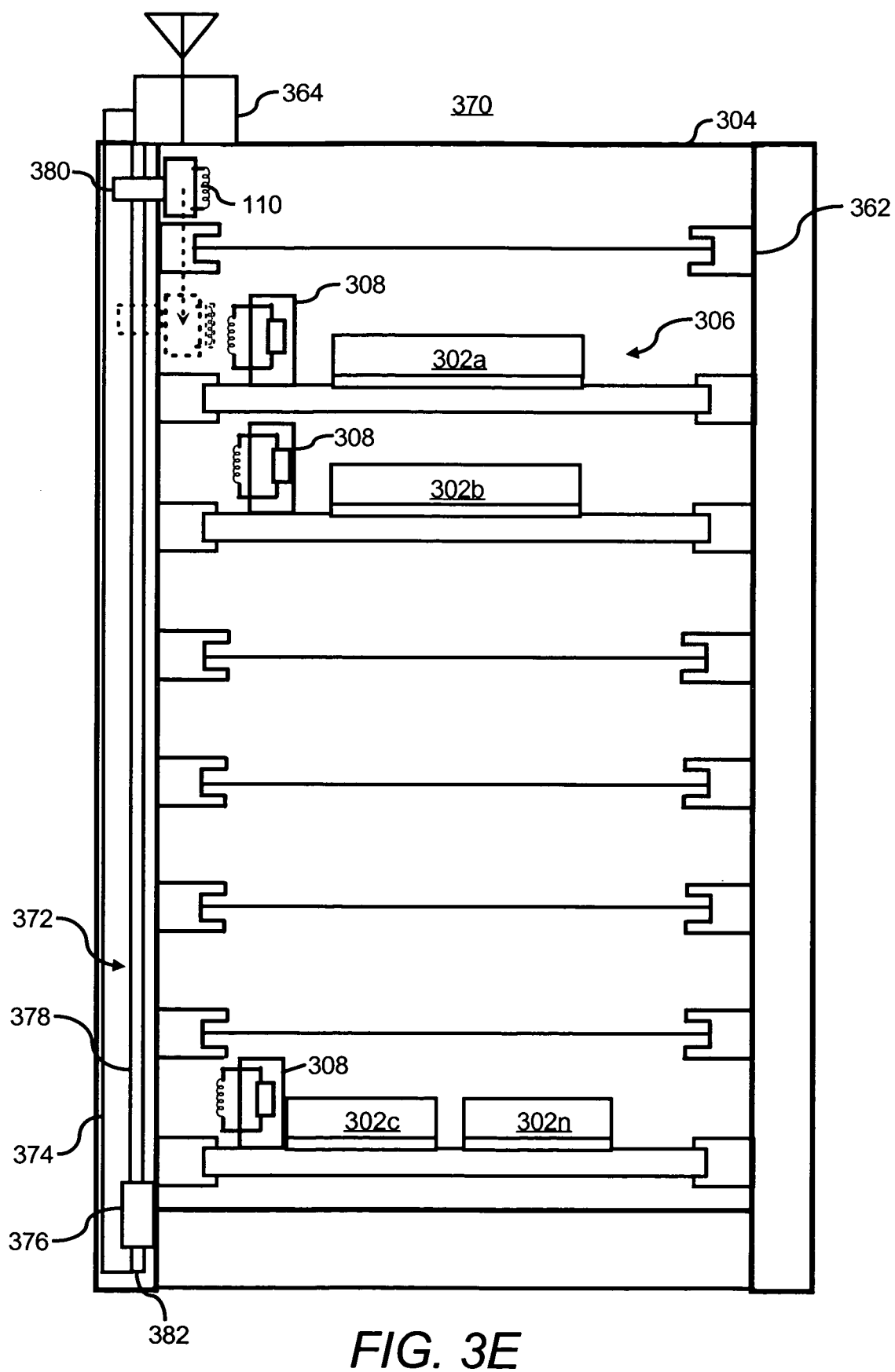

In a still further example, one or more reader devices 110 may be movable with respect to the bays 306 in the rack 304, as shown in FIG. 3E, as described, for instance, in the Ser. No. 10/354,109 application for patent. As described therein, a reader device 110 may be positioned on a traversing mechanism 372 mounted, for instance, to a front face 374 of the rack 304. The traversing mechanism 372 may be mounted to generally ensure that the reader device 110 traverses proximate the tags 308 so as to function within their predetermined transmission ranges.

The traversing mechanism 372 includes a motor 376, a threaded rod 378 that is rotated by the motor 376, and a threaded collar 380 that is linked to the threaded rod 378. In addition, the reader device 110 is attached to the threaded collar 380, such that rotation of the threaded rod 378 causes the reader device 110 to be traversed with respect to the bays 306. A position encoder 382 is attached to or integrated with the motor 376 to sense the angular position of the threaded rod 378 from which the relative longitudinal position of the threaded collar 378 and the reader device 110 may be determined.

As another example of an application for the reader devices described above, FIG. 4 shows a simplified block diagram of an asset locating and tracking system 400 for locating and tracking an array of assets 402a-402n in two dimensions. Although particular has been made herein below to the system 400 as including particular features, it should be understood that the system 400 may include additional components and that some of the components described may be removed and/or modified without departing from a scope of the system 400.

Figure 4:
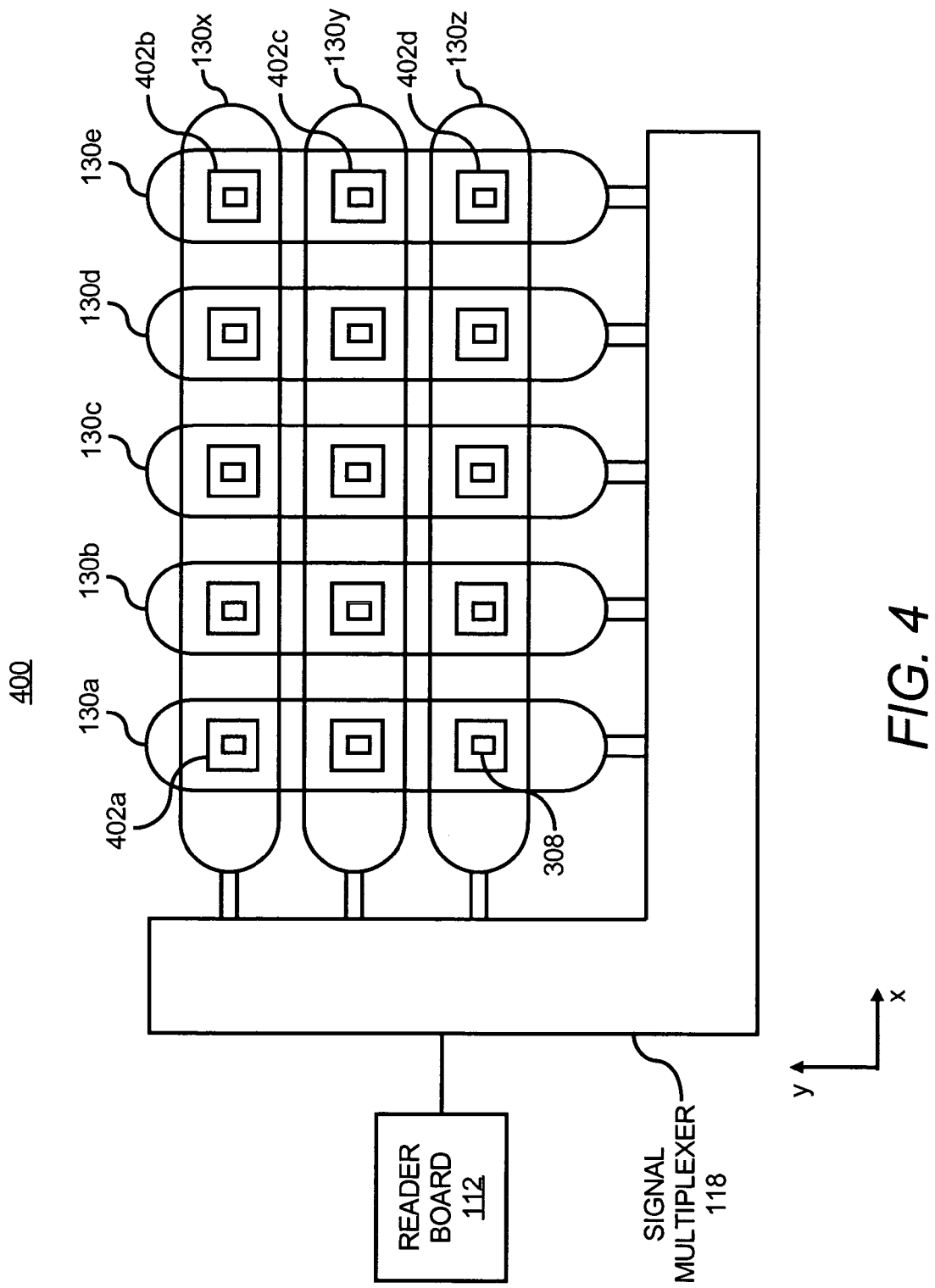
FIG. 4 shows a simplified block diagram of an asset locating and tracking system for tracking an array of assets in two dimensions, according to an embodiment of the invention.

The assets 402a-402n may comprise, for instance, cables arranged in connectors, consumer goods arranged on shelves, etc. The assets 402a-402n are depicted as including respective tags 308, which are configured to be interrogated by a reader device having closely packed antenna circuits 130a-130n configured to substantially prevent or reduce cross-coupling between the antenna circuits 130a-130n. As shown in FIG. 4, the signal multiplexer 118 of the reader device is configured to selectively activate the antenna circuits 130a-130n, which overlap each other in the x and y directions. More particularly, the antenna circuits 130a-130n are structured as a set of linear antenna circuits that surround multiple rows or columns of assets 402a-402n in either the horizontal (X) or the vertical (Y) direction.

In operation, each of the antenna circuits 130a-130n may be sequentially activated and the tags 308 associated with the respective antenna circuits 130a-130n may be identified. In addition, a tag 308 protocol specific tree search algorithm may be employed by the controller 114 to determine the individual identities of the multiple tags 308 that may be present within the resonance signal field of each antenna circuit 130a-130n. For instance, the resonance signal field of the antenna circuit labeled 130e is shown in FIG. 4 as including assets 402b, 402c, and 402d. In addition, by correlating the results from both dimensions, the individual tags 308 may be located and tracked. By way of example, the asset labeled 402d may be identified by the antenna circuits 130e and 130z, and may thus be determined to be located in the lower right corner of the asset 402a-402n array.

It should be understood that the antenna circuits 130a-130n may be configured to have other overlapping schemes to therefore determine the tag 308 locations with differing asset 402a-402n resolutions without departing from a scope of the asset locating and tracking system 400. For instance, a lesser number of antenna circuits 130a-130n may be employed in one or both dimensions to thereby decrease the resolution. In this instance, for example, the locations of the tags 308 may be determined to within two or more locations in the asset 402a-402n array.

In one example, the assets 402a-402n may comprise cables configured to be located and tracked. An example of a cable locating and tracking system is described in copending and commonly assigned U.S. patent application Ser. No. 11/389,751, entitled "RFID ENABLED CABLE TRACKING" filed on even date herewith, the disclosure of which is hereby incorporated by reference in its entirety. As described in that application for patent, RFID antenna circuits may be employed to track cables inserted into connectors of patch panels.

In another example, the assets 402a-402n may comprise consumer goods configured to be located and tracked. For instance, the antenna circuits 130a-130n may be positioned substantially horizontally along one or more shelves and may be configured to identify tags 308 associated with assets 402a-402n placed on or below the antenna circuits 130a-130n. In addition, or alternatively, the antenna circuits 130a-130n may be positioned substantially vertically, such as, on hangers operable to support the assets 402a-402n. In either of these examples, the antenna circuits 130a-130n may be arranged in closely packed antenna arrays.

Although the examples above have been described in terms of the overlapping antenna circuit 130a-130n array depicted in FIG. 4, it should be understood that antenna circuit 130a-130n arrays that do not have overlapping antenna circuits 130a-130n may also be employed to locate and track the assets 402a-402n without departing from the scopes of the examples above. For instance, the assets 402a-402n may be tracked with antenna circuit 130a-130n arrays having a one-to-one relationship with the assets 402a-402n. As another example, the antenna circuit 130a-130n arrays may be configured such that each antenna circuit 130a-130n is operable to identify multiple assets 402a-402n such that the locations of each of the assets 402a-402n may be determined to varying levels of resolution.

Figure 5A:
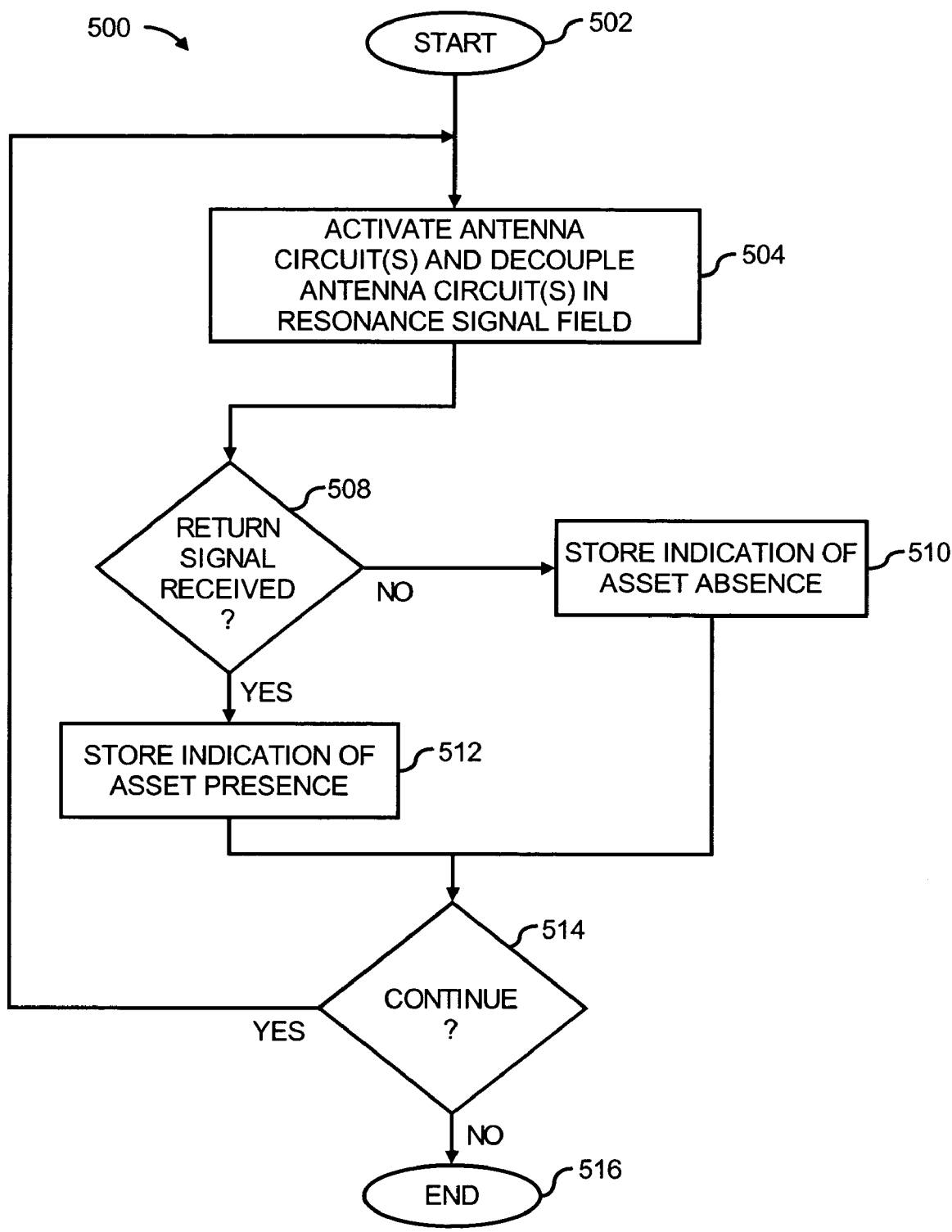
FIG. 5A shows a flow diagram of a method for tracking tags with a reader device, according to an embodiment of the invention.

Turning now to FIG. 5A, there is shown a flow diagram of a method 500 for tracking tags 308 with a reader device, according to an example. It is to be understood that the following description of the method 500 is but one manner of a variety of different manners in which an example of the invention may be practiced. It should also be apparent to those of ordinary skill in the art that the method 500 represents a generalized illustration and that other steps may be added or existing steps may be removed, modified or rearranged without departing from a scope of the method 500.

The description of the method 500 is made with reference to the elements depicted in FIGS. 1, 2A-2E, 3A, and 3B, and thus makes reference to the elements cited therein. It should, however, be understood that the method 500 is not limited to the elements set forth in FIGS. 1, 2A-2E, 3A, and 3B. Instead, it should be understood that the method 500 may be practiced by a system having a different configuration than that set forth in FIGS. 1, 2A-2E, 3A, and 3B.

The method 500 may be initiated at step 502 in response to any of a number of stimuli or conditions. For instance, the method 500 may be manually or automatically initiated. In the latter case, the method 500 may be initiated according to a programmed routine, such as, at various times, for a set duration of time, substantially continuously, etc. In addition, or alternatively, the method 500 may be initiated, for instance, when an asset 302a-302n is detected to be inserted or removed from the rack 304, when a door (not shown) of the rack 304 is detected to have been opened, when an asset 402a-402n is detected to have been removed or added, etc.

Once initiated, the controller 114 may activate one or more of the plurality of closely packed antenna circuits 130a-130n at step 504. In one example, the controller 114 may select to activate the antenna circuits 130a-130n in a sequential manner. In another example, the controller 114 may select to activate selected ones of the antenna circuits 130a-130n or to activate the antenna circuits 130a-130n in a substantially random order. In any regard, the controller 114 may activate the selected antenna circuit(s) 130a-130n through operation of the multiplexer 118. More particularly, for instance, with respect to FIG. 1, the multiplexer 118 may close the switch(es) 124 of the selected antenna circuit(s) 130a-130n to thereby cause the RLC circuit of the selected antenna circuit(s) 130a-130n to generate resonance signal fields to interrogate the tags 308.

In addition, as also indicated at step 504, at least one of the antenna circuits 130a-130n in the resonance signal field of the activated antenna circuit(s) 130a-130n may be decoupled from the activated antenna circuit(s) 130a-130n. In one regard, at least one of the antenna circuits 130a-130n may be decoupled to substantially prevent or reduce cross-coupling of signals between the active antenna circuit(s) 130a-130n and the other antenna circuits 130a-130n. The antenna circuit(s) 130a-130n may be decoupled from the active antenna circuit(s) 130a-130n in any of the manners described herein above with respect to FIGS. 1, and 2A-2E. As such, the antenna circuit(s) 130a-130n located within the resonance signal field(s) of the active antenna circuit(s) 130a-130n may substantially be prevented from interfering with information collected by the active antenna circuit(s) 130a-130n.

Although the decoupling of the at least one antenna circuit 130a-130n at step 504 has been illustrated as being performed substantially simultaneously activation of the at least one antenna circuit 130a-130n, it should be understood that the at least one antenna circuit 130a-130n may be decoupled following activation of the at least one antenna circuit 130a-130n without departing from a scope of the method 500. Moreover, the at least one antenna circuit 130a-130n may be decoupled prior to the at least one antenna circuit 130a-130n being activated, as all of the antenna circuits 130a-130n may initially be set to the decoupled state.

Following step 504, the controller 114 may determine whether a response was received from a tag 308, for instance, in the form of a return signal from the tag 308, at step 508. If a response was not received, the controller 114 may store an indication that an asset 302a-302n, 402a-402n is absent from a location associated with the active antenna circuit 130a, at step 510. If, however, a response was received, the controller 114 may store an indication that an asset 302a-302n, 402a, 402n is present in the location associated with the active antenna circuit 130a, at step 512.

Following steps 510 and 512, the controller 114 may determine whether the method 500 is to be continued, at step 514. The controller 114 may determine that the method 500 is to continue, for instance, if the controller 114 determines that at least one of the antenna circuits 130a-130n has not been activated. In this event, which equates to a "yes" condition at step 514, steps 504-514 may be repeated for one or more of the antennas 130a-130n. In addition, steps 504 and 508-514 may be repeated for any remaining antenna circuits 130a-130n that have not previously been activated. Once all of the antenna circuits 130a-130n have been activated, or if the controller 114 otherwise determines that the method 500 is to be discontinued, the method 500 may end as indicated at step 516.

Figure 5B:
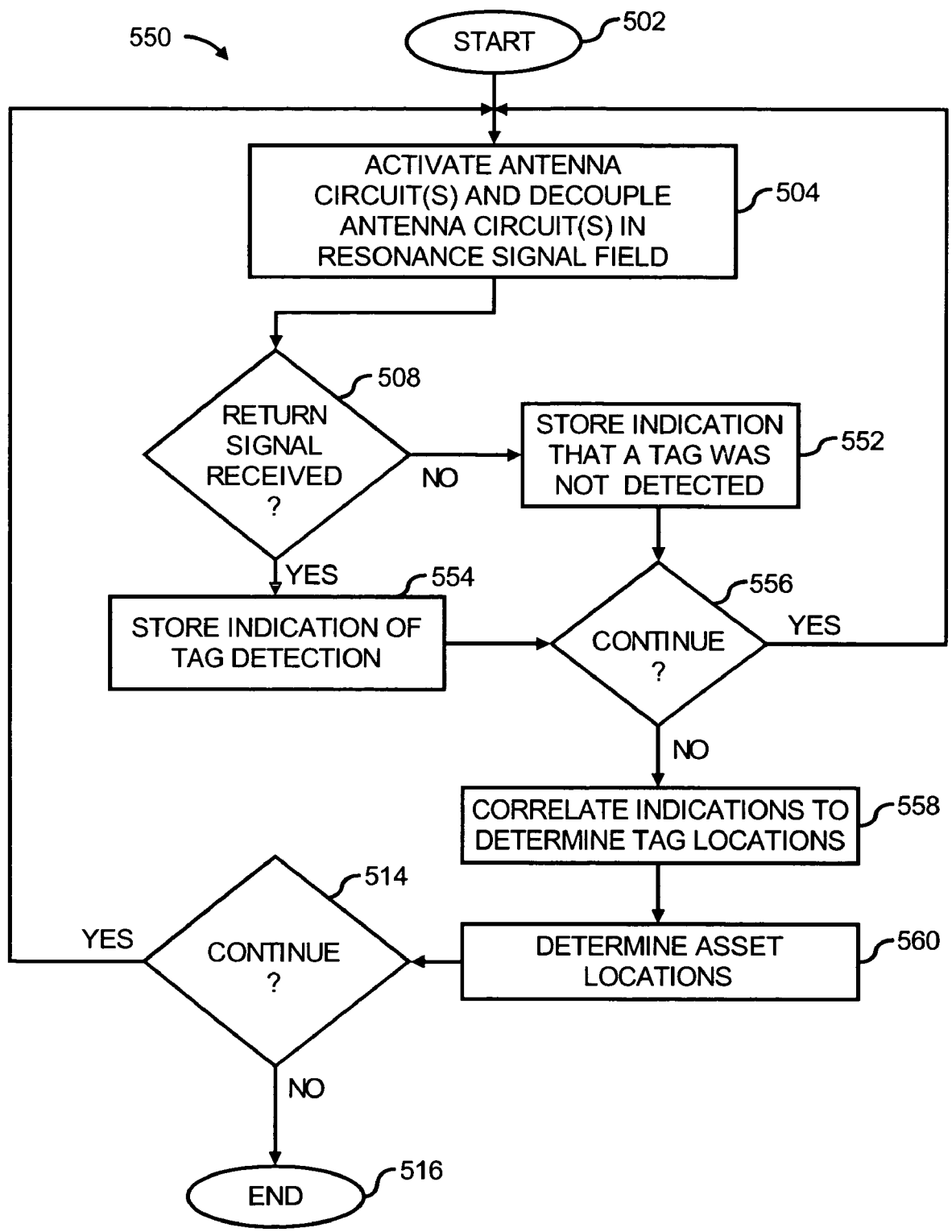
FIG. 5B shows a flow diagram of a method for tracking tags with a reader device having a plurality of antenna circuits, according to another embodiment of the invention.

With reference now to FIG. 5B, there is shown a flow diagram of a method 550 for tracking tags 308 with a reader device having a plurality of overlapping antenna circuits 130a-130n, according to a second example. It is to be understood that the following description of the method 550 is but one manner of a variety of different manners in which an example of the invention may be practiced. It should also be apparent to those of ordinary skill in the art that the method 550 represents a generalized illustration and that other steps may be added or existing steps may be removed, modified or rearranged without departing from a scope of the method 550.

The description of the method 550 is made with reference to the elements depicted in FIGS. 1, 2A-2E, 3C, and 4, and thus makes reference to the elements cited therein. It should, however, be understood that the method 550 is not limited to the elements set forth in FIGS. 1, 2A-2E, 3C, and 4. Instead, it should be understood that the method 550 may be practiced by a system having a different configuration than that set forth in FIGS. 1, 2A-2E, 3C, and 4.

As shown in FIG. 5B, the method 550 includes many of the same steps depicted in the method 500 (FIG. 5A) and may be implemented to perform the same functions. As such, those steps having the same reference numerals are not discussed again in detail. Instead, only those steps in the method 550 that differ from the method 500 are discussed. In addition, the antenna decoupling portion of step 504 may be considered as optional because the method 550 may be performed without requiring that antenna circuits in a resonance signal field of an activated antenna circuit be decoupled from the activated antenna.

In general, the method 550 differs from the method 500 in that the method 550 includes the use of the overlapping antenna circuits 130a-130n. In this regard, in the method 550, the overlapping antenna circuits 130a-130n may be selectively activated and the antenna circuits 130a-130n in the resonance fields of the activated antenna circuits 130a-130n may be decoupled as discussed above with respect to step 504. In addition, a determination as to whether a return signal is received by the selectively activated antenna circuits 130a-130n may be made at step 508.

If a response was not received, the controller 114 may store an indication that a tag 308 has not been detected at step 552.

If, however, a response was received, the controller 114 may store an indication that a tag 308 has been detected at step 554.

At step 556, the controller 114 may determine whether the detection of tags 308 is to be continued. A "yes" condition may be reached, for instance, if the controller 114 determines that at least one of the antenna circuits 130a-130n has not been activated. If there is at least one antenna circuit 130a-130n remaining to be activated, the controller 114 may repeat steps 504, 508 and 552-556 to thereby interrogate any remaining tags 308 associated with the at least one antenna circuits 130a-130n. A "no" condition may be reached at step 556 if the controller 114 determines that all or a desired number of antenna circuits 130a-130n have been activated.

Following the "no" condition at step 556, the controller 114 may correlate the detected tag 308 indications to determine the tag 308 locations, as indicated at step 558. More particularly, as discussed above with respect to FIGS. 3C and 4, the controller 114 may process the information obtained by the overlapping antenna circuits 130a-130n in a number of manners to determine the tag 308 locations.

Following a determination of the tag 308 locations at step 558, the locations of the assets 302a-302n, 402a-402n may be determined at step 560. The asset 302a-302n, 402a-402n locations may be determined by correlating the tags 308 with their associated assets 302a-302n, 402a-402n. In addition, the asset 302a-302n, 402a-402n location information may be stored, outputted, or both.

Once step 560 is completed, the controller 114 may determine whether to continue with the method 550 as described above with respect to step 514 (FIG. 5A). In addition, the method 550 may end as indicated at step 516.

Some or all of the operations set forth in the methods 500 and 550 may be contained as a utility, program, or subprogram, in any desired computer accessible medium. In addition, the method 300 may be embodied by a computer program, which may exist in a variety of forms both active and inactive. For example, it can exist as software program(s) comprised of program instructions in source code, object code, executable code or other formats. Any of the above can be embodied on a computer readable medium, which include storage devices and signals, in compressed or uncompressed form.

Exemplary computer readable storage devices include computer system RAM, ROM, EPROM, EEPROM, and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that any electronic device capable of executing the above-described functions may perform those functions enumerated above.

Figure 6:
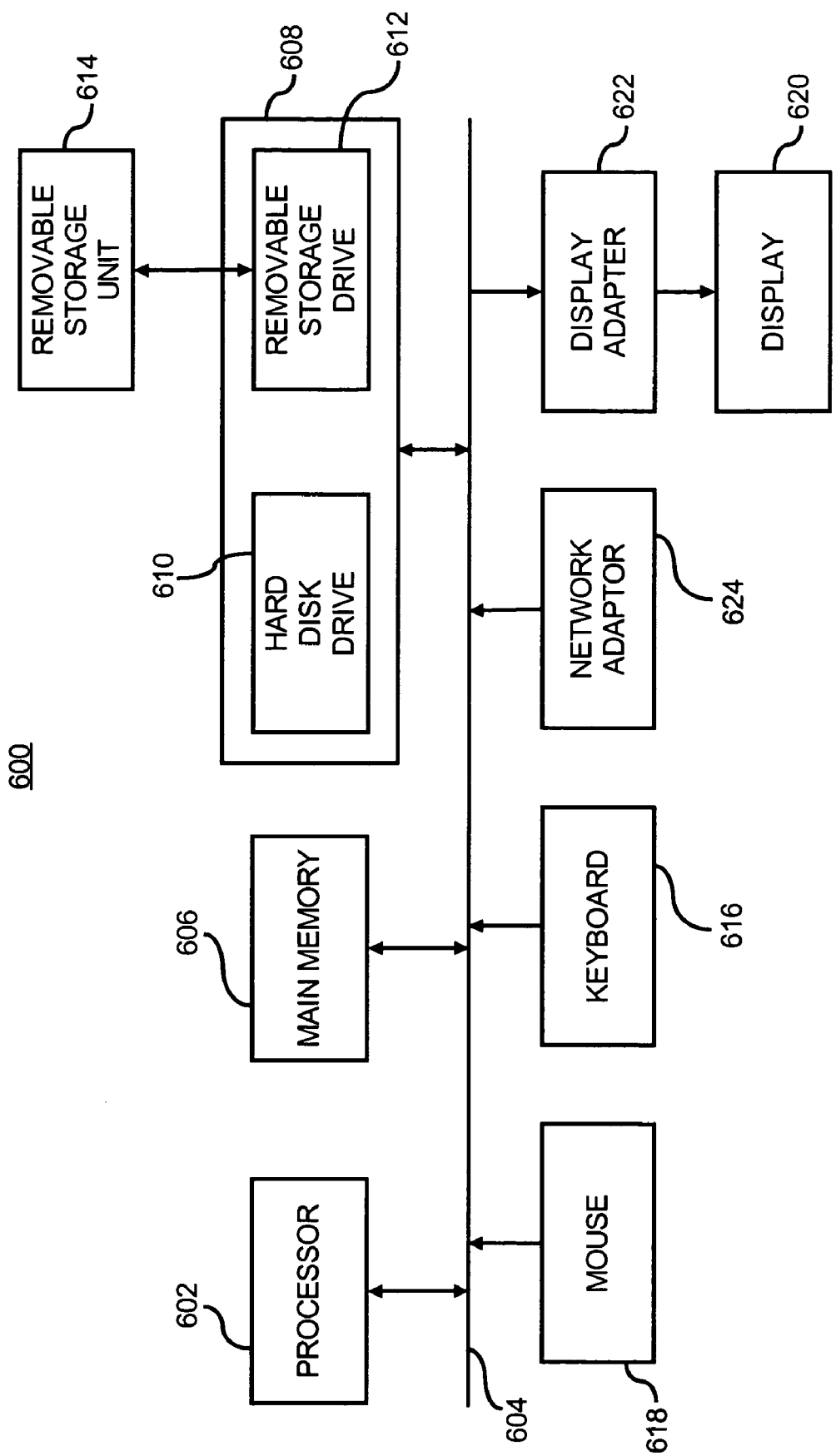
FIG. 6 illustrates a computer system, which may be employed to perform various functions described herein, according to an embodiment of the invention.
Figure 7:
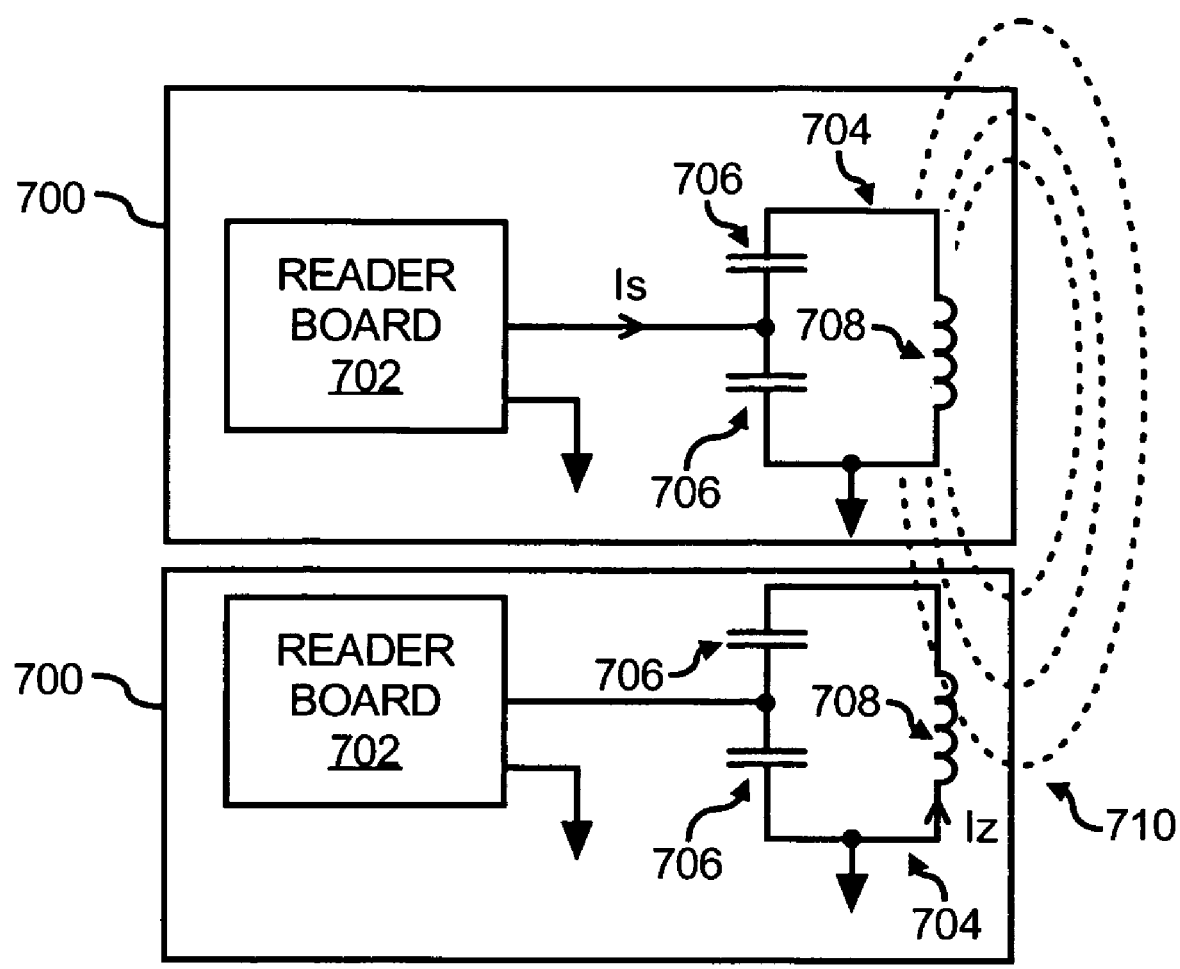
FIG. 7 illustrates a block diagram of reader devices.

FIG. 6 illustrates a computer system 600, which may be employed to perform the various functions of the controller 114 described herein above, according to an example. In this respect, the computer system 600 may be used as a platform for executing one or more of the functions described hereinabove with respect to the controller 114.

The computer system 600 includes a processor 602 that may be used to execute some or all of the steps described in the methods 500 and 550. Commands and data from the processor 602 are communicated over a communication bus 604. The computer system 600 also includes a main memory 606, such as a random access memory (RAM), where the program code for, for instance, the controller 114, may be executed during runtime, and a secondary memory 608. The secondary memory 608 includes, for example, one or more hard disk drives 610 and/or a removable storage drive 612, representing a floppy diskette drive, a magnetic tape drive, a compact disk drive, etc., where a copy of the program code for tracking tags may be stored. In addition, information pertaining to at least one of the locations of the tags 308 and the identities of the assets 302a-302n, 402a-402n may also be stored in at least one of the main memory 606 and the secondary memory 608.

The removable storage drive 610 may read from and/or write to a removable storage unit 614 in a well-known manner. User input and output devices may include, for instance, a keyboard 616, a mouse 618, and a display 620. A display adaptor 622 may interface with the communication bus 604 and the display 620 and may receive display data from the processor 602 and convert the display data into display commands for the display 620. In addition, the processor 602 may communicate over a network, for instance, the Internet, LAN, etc., through a network adaptor 624.

It will be apparent to one of ordinary skill in the art that other known electronic components may be added or substituted in the computer system 400. In addition, the computer system 600 may include a system board or blade used in a rack in a data center, a "white box" server or computing device, etc. Also, one or more of the components in FIG. 6 may be optional (for instance, user input devices, secondary memory, etc.).

What has been described and illustrated herein is a preferred embodiment of the invention along with some of its variations. The terms, descriptions and figures used herein are set forth by way of illustration only and are not meant as limitations. Those skilled in the art will recognize that many variations are possible within the scope of the invention, which is intended to be defined by the following claims—and their equivalents—in which all terms are meant in their broadest reasonable sense unless otherwise indicated.

What is claimed is:

1. A reader device for locating and tracking multiple tags, said reader device comprising:
    a plurality of closely packed antenna circuits;
    at least one controller configured to control the plurality of closely packed antenna circuits; and
    wherein the at least one controller is configured to activate one or more of the antenna circuits to generate at least one resonance signal field configured to interrogate at least one tag while substantially preventing or reducing cross-coupling of signals between the one or more active antenna circuits and at least one antenna circuit within the at least one resonance signal field to a sufficiently low level, wherein the sufficiently low level substantially prevents misreads from unwanted tags, to thereby track the multiple tags in a substantially controlled manner.

2. The reader device according to claim 1, wherein the plurality of closely packed antenna circuits comprise at least one configuration designed to substantially prevent or reduce cross-coupling with one or more activated antenna circuits.

3. The reader device according to claim 2, wherein the plurality of closely packed antenna circuits comprise RLC circuits, wherein the resistors are employable to control Q-factors for the antenna circuits.

4. The reader device according to claim 3, further comprising:
    a complementary pair of MOSFET transistors positioned to generate drive signals to the RLC circuits.

5. The reader device according to claim 1, wherein the plurality of closely packed antenna circuits comprise switches positioned between at least one of a capacitor and a ground and an inductor and a ground, and wherein the switches are configured to be opened for inactivated ones of the plurality of closely packed antenna circuits.

6. The reader device according to claim 1, wherein the plurality of antenna circuits comprise respective LC circuits, wherein a capacitor of each of the LC circuits comprises a variable capacitor, and wherein the at least one controller is configured to vary the capacitance of and thereby detune the LC circuits located within the resonance signal field of the active antenna circuit.

7. The reader device according to claim 1, wherein at least one of the plurality of closely packed antenna circuits is configured to interrogate a plurality of the tags to thereby reduce the resolution of the tag locations to one or more positions.

8. The reader device according to claim 1, wherein at least one of the plurality of closely packed antenna circuits overlaps at least one other closely packed antenna circuit to thereby occupy common space and energize shared spatial regions with the at least one other closely packed antenna circuit.

9. The reader device according to claim 8, wherein the number of overlapping plurality of closely packed antenna circuits is selected to vary the resolution in determining the locations of the tags.

10. The reader device according to claim 1, wherein the tags are associated with respective assets, wherein the assets comprise one or more of electronic equipment, cables, and consumer goods.

11. A method for locating and tracking tags with a reader device, said reader device having at least one antenna circuit, said method comprising:
    activating the at least one antenna circuit to generate a resonance signal field configured to interrogate a tag associated with the active at least one antenna circuit; and
    decoupling at least one other antenna circuit positioned within the resonance signal field of the active at least one antenna circuit to reduce cross-coupling of signals between the active at least one antenna circuit and the at least one other antenna circuit positioned within the resonance signal field to a sufficiently low level, wherein the sufficiently low level substantially prevents misreads from unwanted tags.

12. The method according to claim 11, further comprising:
    determining whether a signal is returned by a tag associated with the active at least one antenna circuit;
    storing an indication that an asset associated with the tag is present at a location corresponding to the active at least one antenna circuit in response to a signal being returned by the tag associated with the active at least one antenna circuit; and
    storing an indication that the location corresponding to the active at least one antenna circuit does not contain an asset in response to a signal not being returned.

13. The method according to claim 12, wherein the at least one other antenna circuit comprises an RLC circuit and wherein decoupling the at least one other antenna circuit further comprises varying the Q-factor for the RLC circuit.

14. The method according to claim 11, wherein the at least one antenna circuit overlaps the at least one other antenna circuit, the method further comprising:

sequentially activating the overlapping antenna circuits;
correlating indications received by the overlapping antenna circuits; and
determining locations of the tags based upon the correlations.

15. The method according to claim 11, wherein the at least one antenna circuit is configured to interrogate a plurality of tag locations, said method further comprising:
determining a position of a tag to within multiple locations of the plurality of tag locations.

16. The method according to claim 11, wherein the reader device has a plurality of closely packed antenna circuits, wherein the tags are associated with respective assets, wherein the plurality of closely packed antenna circuits are positioned to emit resonance signal fields toward respective tags, and wherein the method further comprises sequentially activating the plurality of closely packed antenna circuits while decoupling at least one of the plurality of antenna circuits positioned with in the resonance signal field of the active antenna circuit to thereby determine the locations of the assets.

17. An apparatus for tracking a plurality of electronic devices having a plurality of radio frequency (RF) tags associated therewith, said apparatus comprising:

a rack having a plurality bays, said plurality of bays housing the plurality of electronic devices; and
at least one reader device having at least one antenna circuit, wherein the at least one reader device is configured to interrogate a plurality of RF tags through generation of at least one resonance signal field while substantially preventing or reducinci cross-coupling of signals between the at least one antenna circuit and at least one other antenna circuit within the at least one resonance signal field to a sufficiently low level, to thereby determine at least one of a location and presence of an electronic device located in a first bay and an electronic device located in a second bay of the rack.

18. The apparatus according to claim 17, wherein the at least one reader device comprises a plurality of antenna circuits.

19. The apparatus according to claim 17, wherein the at least one antenna circuit is configured to interrogate a plurality of tags.

20. The apparatus according to claim 17, wherein the at least one antenna circuit overlaps at least one other antenna circuit to thereby occupy common space and energize shared spatial regions with the at least one other antenna circuit.

* * * * *

UNITED STATES PATENT AND TRADEMARK OFFICE
CERTIFICATE OF CORRECTION

PATENT NO. : 7,686,229 B2
APPLICATION NO. : 11/389750
DATED : March 30, 2010
INVENTOR(S) : Geoff Lyon et al.

It is certified that error appears in the above-identified patent and that said Letters Patent is hereby corrected as shown below:

In column 16, line 7, in Claim 17, delete "reducinci" and insert -- reducing --, therefor.

Signed and Sealed this

Twelfth Day of October, 2010

David J. Kappos
*Director of the United States Patent and Trademark Office*